United States Patent Office 2,727,892
Patented Dec. 20, 1955

2,727,892

PREPARATION OF PROCAINE PENICILLIN

Robert R. Umbdenstock, Islip, N. Y., assignor to Chas. Pfizer & Co., Inc., Brooklyn, N. Y., a corporation of Delaware No Drawing. Application July 10, 1952,
Serial No. 298,185

2 Claims. (Cl. 260—239.1)

This invention is concerned with a process for preparing uniform, finely divided crystals of procaine penicillin.

Procaine penicillin has been established as a valuable therapeutic preparation, especially for injection in animals or man as an aqueous suspension. It is commonly prepared by metathetically reacting in a solvent medium a procaine salt and a penicillin salt. There is one serious drawback in the manufacture of this form of penicillin, however: its tendency to precipitate in crystals of a variety of sizes and shapes. The crystals are most generally non-uniform, and control of the particle size proves very difficult. One particular advantage of this salt of the antibiotic is its comparative insolubility. Because of this it remains for prolonged periods of time in the blood stream and is excreted but slowly. Hence the blood level of penicillin remains high much longer than with other salt forms, so the patient requires much fewer injections and has consequently much less discomfort. At the same time, this very insolubility of procaine penicillin gives it one major disadvantage: the high content of antibiotic in the blood, which is so necessary to combat disease, is not achieved for a most undesirably long time after injection. This problem has been eased by adding to the procaine penicillin a certain amount of a water-soluble penicillin salt, which serves to bring about a rapid rise in antibiotic blood level, after which the slow dissolution of the procaine salt itself maintains that level. However, this compromise has its disadvantages in cost, complexity of preparation and difficulty of quality control. Such disadvantages are overcome, and a new method of obtaining a startlingly efficient type of crystalline procaine penicillin is provided by the present invention. According to this invention, extremely finely divided but very uniform crystals of procaine penicillin are produced which have a number of advantages over the products recovered by standard procedures. The new crystals may be varied in particle size without greatly changing the uniformity, and allow for exact control of the blood level of the antibiotic in most individuals. Too, such crystals are readily made into suspensions which are uniform in properties, a vital factor in the medical field. The particles in these suspensions show much less tendency to settle out than those of the usual injectable preparations. If on long standing they do separate some, they may be readily resuspended with a minimum of effort. Furthermore, with the particularly fiinely divided crystals which can be prepared by this novel process, an effective blood level in the host is established much more rapidly than with procaine penicillin suspensions made from known heterogeneously sized crystalline materials. This property of the new crystals seems related to their very fine, uniform particle size, which exposes a larger surface area of procaine penicillin to the action of bodily fluids and thus allows the more rapid dissolution of the compound and the more rapid establishment of an effective blood level of the antibiotic.

The process which brings about these desirable results broadly comprises interreacting procaine and penicillin in a solvent system in a field of ultrasonic energy. The terms "procaine" and "penicillin" are here used generically, of course, to mean the respective base and acid per se, or various of their salts, or generally any compound thereof which will enter into the desired usual metathesis which occurs. Specifically, the procaine penicillin may be formed by mixing an aqueous solution of a procaine salt with an aqueous solution of a penicillin salt in the presence of ultrasonic vibrations.

It is obvious that the anion of the procaine salt and the cation of the penicillin salt should best be chosen so that they do not together form a compound which is insoluble in the medium used for the metathetical reaction. Thus, preferably procaine hydrochloride and an alkali metal salt of the antibiotic, especially sodium penicillin, are reacted in an aqueous system. The by-product formed, e. g. sodium chloride, is normally very soluble in water and will not interfere with the recovery of the precipitated procaine penicillin. Various other salts of procaine may obviously be employed in place of the hydrochloride, for example the hydrobromide, acetate and so forth. Similarly, many water-soluble salts of penicillin may be used, including sodium penicillin, potassium penicillin, ammonium penicillin, triethylamine penicillin, etc. The reaction is most conveniently and successfully run in water with salts like these. However, it is also possible to conduct the metathesis in non-aqueous media. Thus, methanol solutions of proper reactants may be prepared. Alternatively, too, instead of using salts of penicillin and procaine, a solvent solution of procaine base and a solvent solution of penicillin acid may be interreacted to produce the desired procaine penicillin salt.

The great improvement of this invention and the novel results thereby achieved reside in the peculiar feature of contacting the procaine compound with the penicillin compound in a field of ultrasonic energy. For instance, the procaine solution (e. g. procaine hydrochloride in water) may be subjected to ultrasonic vibrations and a solution of penicillin (e. g. an aqueous solution of an alkali metal penicillin) may be gradually added thereto. The crystals of procaine penicillin which are formed in this manner are highly uniform in size and shape and very finely divided. Without the use of the ultrasonic energy, crystals ranging from ten to several hundred microns in maximum dimension may result from one metathetical operation, and such a product is obviously very non-uniform. However, using ultrasonic vibrations of about 300 kilocycles per second, or say as a preferred range substantially between 300 and 500 kilocycles per second, it is found that the crystals produced, under otherwise the same conditions, range only up to about 15 microns in maximum dimension and are most uniform. The particle size of the product may be varied readily and predictably by altering the levels of ultrasonic energy applied during metathesis. This not only assures a uniform product, but allows easy and accurate quality control. Generally speaking, as the wave lengths increase, the crystal size increases and vice versa. Ultrasonic vibrations of from about 200 to 2000 kilocycles per second are broadly operable to yield carefully controlled crystal sizes, uniform and small enough to be unusually valuable in therapy.

Instead of adding the penicillin compound to the procaine compound already in an ultrasonic field, the two reactant solutions may be simultaneously brought together in a zone where the required energy is being applied. This may be accomplished with suitable apparatus, such that the solutions meet and mix rapidly in the zone where the ultrasonic energy has been focused.

Since procaine penicillin crystals form quite rapidly under these conditions, relatively large volumes of material can be prepared with considerable ease using such a flow-type system. Alternatively, too, the penicillin solution may be energized first and the procaine solution added to it. The new process readily lends itself to continuous operation, the reactants being passed continuously through the ultrasonic field and the precipitated crystals being continuously withdrawn therefrom.

A variety of apparatus may be used for the generation of suitable energy fields. Certain equipment is commercially available and other types have been described in many authoritative reference works, such as "Ultrasonics" by B. Carlin, McGraw-Hill Book Company, New York (1949) and "Ultrasonics" by P. Vigoureaux, John Wiley & Sons, Inc., New York (1951).

According to one preferred embodiment of this invention, there is utilized a further great advantage of the ultrasonic vibrations. Thus, when procaine and penicillin solutions are mixed in the presence of a sufficiently high frequency field, that is in the range of between about 300 and 500 kilocycles per second, the procaine penicillin is sterilized as it is produced. Of course, this operation is not essential and finely divided crystals may be produced at lower frequencies than are generally necessary for sterilization in the pharmaceutical industry. Since heat is often generated by the application of ultrasonic vibrations to liquid systems, it may be necessary to cool the reactor. This may be accomplished by means of conventional arrangements like cooling jackets or coils.

The following example is given by way of illustration and is not to be considered as the sole embodiment of this invention. It is to be understood that protection hereof is only to be limited by the specific wording of the appended claims.

*Example*

An aqueous solution of procaine hydrochloride (about 10% by weight), at about room temperature, was subjected to a field of ultrasonic vibrations of approximately 300 kilocycles per second. The source of the energy was a conventional ultrasonic generator with a quartz crystal and suitable apparatus for applying the necessary voltage. After the generator had been started, a 10% by weight solution of potassium penicillin in water was added with thorough stirring to the procaine solution.

When the two solutions met, they instantly interreacted to form extremely finely divided, uniform crystals of procaine penicillin. After the addition of approximately a molar quantity of the penicillin salt, which addition took a very short time, the ultrasonic generator was disconnected and the precipitate filtered at once. The filter cake was washed with a small volume of water and dried. The resulting crystals were compared with others formed under otherwise the same conditions but without the novel ultrasonic energy. The crystals of the new process were determined to be much smaller in dimension than the conventional material, and much more uniform in size and shape. The product of the prior art method consisted of irregular plates varying from 10 to 200 microns in maximum dimension with no single size predominating. The new product consisted primarily of crystals in which the maximum dimension varied only between about 5 and 15 microns.

It is obvious that many variations may be made in this process without falling outside the scope of the invention. Thus, rather than using potassium penicillin as in the example, it is possible to use the calcium salt, a lower aliphatic amine salt or other water- or solvent-soluble salts of the antibiotic. Furthermore, the nature of the procaine penicillin product may be varied considerably by using forms of penicillin other than G, for instance penicillin F, penicillin X and so forth. The ultrasonic energy may be generated by Rochelle salt crystals and the like, as well as quartz. It is obvious that the solutions of procaine and penicillin to be reacted should best be of such concentration that the resulting procaine penicillin will readily separate from the liquid medium as a solid phase. The reaction may be run at elevated temperatures, but there is no specific advantage in doing so, and, as noted before, it may indeed be desirable to remove excessive heat from the system.

What is claimed is:

1. A process for the preparation of finely divided, uniform crystals of procaine penicillin, which comprises interacting in a solvent system a form of procaine selected from the class consisting of procaine, procaine hydrochloride, procaine hydrobromide and procaine acetate, with a form of penicillin selected from the class consisting of penicillin, its alkali metal salts, ammonium penicillin and triethylamine penicillin, in the presence of ultrasonic vibrations of substantially between 200 and 2000 kilocycles per second.

2. A process for the preparation of finely divided, uniform crystals of procaine penicillin, which comprises mixing an aqueous solution of an alkali metal salt of penicillin with an aqueous solution of procaine hydrochloride in the presence of ultrasonic vibrations of substantially between 300 and 500 kilocycles per second.

References Cited in the file of this patent

UNITED STATES PATENTS 2,515,898     Rhodehamel _____ July 18, 1950

OTHER REFERENCES

Chem. Abstracts, vol. 35, page 5368 (1941).
Chem. Abstracts, vol. 44, page 9 (1950)
Chem. Abstracts, vol. 34, page 6206 (1940).
Grove, "Ind. and Eng. Chem.," vol. 40, Jan. 1948, page 13.